United States Patent
Tseng

(10) Patent No.: US 8,903,622 B2
(45) Date of Patent: Dec. 2, 2014

(54) VEHICLE POWER GENERATION SYSTEM AND METHOD THEREOF

(75) Inventor: Chien-Ping Tseng, Kaohsiung (TW)

(73) Assignee: Kwang Yang Motor Co., Ltd, Kaohsiung (TW)

(*) Notice: Subject to any disclaimer, the term of this patent is extended or adjusted under 35 U.S.C. 154(b) by 0 days.

(21) Appl. No.: 13/548,413

(22) Filed: Jul. 13, 2012

(65) Prior Publication Data

US 2013/0024078 A1  Jan. 24, 2013

(30) Foreign Application Priority Data

Jul. 22, 2011 (TW) .............................. 100125946 A

(51) Int. Cl.
| | | |
|---|---|---|
| *B64D 31/00* | (2006.01) | |
| *B60W 30/188* | (2012.01) | |
| *B60L 11/12* | (2006.01) | |
| *B60W 10/02* | (2006.01) | |
| *B60R 16/02* | (2006.01) | |
| *B60W 10/30* | (2006.01) | |
| *B60W 10/06* | (2006.01) | |
| *B60L 3/00* | (2006.01) | |

(52) U.S. Cl.
CPC ............ *B60W 30/1886* (2013.01); *B60L 11/12* (2013.01); *B60W 10/02* (2013.01); *Y02T 10/7077* (2013.01); *Y02T 10/70* (2013.01); *B60R 16/02* (2013.01); *B60W 10/30* (2013.01); *B60W 10/06* (2013.01); *B60L 3/0069* (2013.01)
USPC .......................................................... 701/100

(58) Field of Classification Search
CPC . B60L 11/16; B60L 11/1809; B60L 11/1838; B60L 11/1851; B60L 11/1861; B60L 11/1864; B60L 11/1868; B60L 11/1872; B60L 2240/36; B60L 2240/425; B60L 2240/445; B60L 2240/485; B60L 2240/525; B60L 2240/545; B60L 3/0069; B60L 11/12; B60W 10/02; B60W 10/06; B60W 10/30; B60W 30/1886; B60R 16/02; Y02T 10/70; Y02T 10/7077
USPC ................. 701/51–54, 67, 86, 112; 180/189, 180/205.4, 206.4, 278, 292–295, 339; 903/903, 906
See application file for complete search history.

(56) References Cited

U.S. PATENT DOCUMENTS

| 6,067,492 | A | * | 5/2000 | Tabata et al. ...................... 701/51 |
| 6,148,784 | A | * | 11/2000 | Masberg et al. ............ 123/192.1 |
| 6,463,375 | B2 | * | 10/2002 | Matsubara et al. ............. 701/54 |
| 7,583,041 | B2 | * | 9/2009 | Yamaguchi et al. .......... 318/471 |
| 7,996,145 | B2 | * | 8/2011 | Snyder .......................... 701/104 |
| 2001/0047896 | A1 | | 12/2001 | Matsuura et al. |
| 2002/0019691 | A1 | * | 2/2002 | Matsubara et al. ............. 701/54 |

(Continued)

OTHER PUBLICATIONS

European Patent Office, "Search Report", Apr. 2, 2014.

*Primary Examiner* — Mary Cheung
*Assistant Examiner* — Atul Trivedi
(74) *Attorney, Agent, or Firm* — WPAT, PC; Justin King

(57) ABSTRACT

The vehicle power generation system includes: a power generation unit, a power supply unit, a clutch mechanism, and a control unit. The power generation unit includes generator, power input shaft, and a power output unit. The clutch mechanism includes a speed increasing unit and a motor controller for attaching the speed increasing unit to the crankshaft or detaching the speed increasing unit from the crankshaft. The control unit is electrically connected to the motor controller, and includes a power generation condition determining unit.

8 Claims, 4 Drawing Sheets

(56) References Cited

U.S. PATENT DOCUMENTS

| | | |
|---|---|---|
| 2002/0165659 A1* | 11/2002 | Boggs et al. .................. 701/112 |
| 2002/0165660 A1* | 11/2002 | Boggs et al. .................. 701/112 |
| 2003/0173123 A1* | 9/2003 | Nakanowatari ............. 180/65.2 |
| 2003/0232696 A1* | 12/2003 | Shibagaki ....................... 477/76 |
| 2004/0079564 A1* | 4/2004 | Tabata ........................ 180/65.2 |
| 2005/0109550 A1 | 5/2005 | Buglione et al. |
| 2005/0283298 A1* | 12/2005 | Ochi et al. ....................... 701/67 |
| 2006/0076840 A1* | 4/2006 | Yamaguchi et al. ............ 310/53 |
| 2007/0205029 A1* | 9/2007 | Leone et al. ................. 180/65.2 |
| 2008/0099257 A1 | 5/2008 | Betz et al. |
| 2008/0294329 A1* | 11/2008 | Noda ............................ 701/112 |
| 2009/0017984 A1* | 1/2009 | Shibata et al. ..................... 477/3 |
| 2009/0118090 A1* | 5/2009 | Heap et al. ....................... 477/98 |
| 2009/0166108 A1 | 7/2009 | Gross et al. |
| 2009/0186741 A1* | 7/2009 | Lane et al. ........................ 477/3 |
| 2009/0276128 A1* | 11/2009 | Whitney et al. ................. 701/54 |
| 2010/0063662 A1* | 3/2010 | Harada et al. ................... 701/22 |
| 2010/0087994 A1* | 4/2010 | Bai ................................. 701/54 |
| 2010/0125019 A1* | 5/2010 | Tabata et al. ...................... 477/3 |
| 2010/0197449 A1* | 8/2010 | Imamura et al. ................... 477/3 |
| 2010/0236502 A1* | 9/2010 | Watanabe et al. .......... 123/41.02 |
| 2013/0024078 A1* | 1/2013 | Tseng ............................. 701/51 |

* cited by examiner

VEHICLE POWER GENERATION SYSTEM AND METHOD THEREOF

CROSS-REFERENCE TO RELATED APPLICATION

This application claims the benefit of Taiwan Patent Application No. 100125946, filed on Jul. 22, 2011, which is hereby incorporated by reference for all purposes as if fully set forth herein.

FIELD OF THE INVENTION

The present invention relates to a vehicle power generation system and the method thereof; more particularly, to a vehicle power generation system combined with a power system, which is originally included in the vehicle, and the method thereof.

RELATED ART

Conventional portable engine generator generally includes frame body, fuel tank, engine, generator, and power supply interface. Since the engine generator operates independently, it is portable and may be moved to various places when required. On the other hand, there are vehicles in the market which recharge the vehicle battery by employing attached charging generator driven by engine crankshaft; however, the design is usually used for charging vehicle battery only, and may not be used provide power supply for other electric devices other than the vehicle battery as the foregoing portable engine generator.

Further, most components needed in the portable engine generator are already included in the vehicles in the market except for the power supply interface that supplies power to the other devices. As far as we know, there are few, if any, patent application regarding the technology of combining the components of the portable engine generator with the vehicle power components. And since the original vehicle engine is designed to provide power for vehicles, a well-designed control strategy must be developed when the engine is also used for supplying power for other devices, in order to ensure the using safety of the original vehicle.

SUMMARY

In order to overcome the deficiencies of the prior art, one objective of the present invention is to provide a vehicle power generation system, which combines an engine generator's feature of providing power for external use (other devices) and providing power for vehicle wheels, and the method thereof.

The vehicle power generation system according to the present invention includes: a power generation unit including generator, power input shaft for driving the generator, and power output unit electrically connected to the generator; a power supply unit connected to the power output unit, and is provided with a power connecting interface; a clutch mechanism, including a speed increasing unit connected to the power input shaft, and a motor controller used for attaching the speed increasing unit to the crankshaft/detaching the speed increasing unit from the crankshaft; a control unit electrically connected to the motor controller, and includes a power generation condition determining unit for determining whether the vehicle is under a condition that is suitable for power generation, and then driving the clutch mechanism based on the result. Thereby, after the control unit receives a power generating mode switching signal to confirm that the vehicle is under a condition suitable for power generation, the control unit drives the clutch mechanism to attach to the crankshaft of the engine, thereby allowing the crankshaft to be connected to the power input shaft of the generator, and increasing the rotation speed of the engine to a first setting rotation speed value, and then increasing the rotation speed even more to a second setting rotation speed value through the speed increasing unit, thus the generator is driven and electrical power for the power supply unit is hence generated; wherein, after the control unit receives a vehicle-moving mode switching signal, the control unit drives the clutch mechanism to detach from the crankshaft, thereby ending power generation.

In one embodiment, the power generation condition determining unit determines whether the vehicle is under a safe and stationary condition suitable for power generation according to the conditions included: a wheel speed of the vehicle is 0; gearshift of the vehicle is moved to neutral or parking position; a throttle opening of the vehicle is at an idle speed position; a handbrake lever of the vehicle is pulled up to a locked position; and temperature of the generator is not overheated, which means that the temperature of the generator falls into a predetermined safe temperature range.

In one embodiment, the control unit further comprises an alarming unit, the alarming unit may at least use corresponding audio sound or light signals to indicate whether the vehicle is in a vehicle-moving mode, a power generating mode, or an alarming mode, wherein when the crankshaft is attached to the vehicle transmission unit, the vehicle is in the vehicle-moving mode; when the crankshaft is attached to the generator and the power generation condition determining unit determines that the vehicle is under a condition suitable for power generation, the vehicle is in the power generating mode; and the vehicle is in the alarming mode including: any one of the wheel speed of the vehicle is not 0, the gearshift of vehicle is not moved to neutral or parking position, the handbrake lever of the vehicle is not pulled up to a locked position; the throttle opening of the vehicle is not at an idle speed position, or the temperature of the generator exceeds a predetermined safe temperature value.

The vehicle power generation method according to the present invention includes: providing a power generation unit; obtaining a mode switching signal; determining whether the vehicle is under a condition that is suitable for power generation; releasing a brake of the power generation unit; using a clutch mechanism to attach a crankshaft to the power generation unit; increasing an engine rotation speed to a first setting rotation speed value, and increasing the first setting rotation speed value to a second setting rotation speed value by using a speed increasing unit, to drive the power generation unit to generate power; and outputting power through a current leakage and overload device.

In one embodiment, confirming the step of determining whether the vehicle is under a safe and stationary condition suitable for the power generation is performed based on conditions included: a wheel speed of the vehicle is 0; a gearshift of the vehicle is moved to neutral or parking position; a handbrake lever of the vehicle is pulled up to a locked position; a throttle opening of the vehicle is at an idle speed position; the engine is not overheated, which means that the temperature of the engine does not exceed a predetermined safe temperature; an engine coolant temperature is not overheated, which means that the temperature of the engine coolant does not exceed a predetermined safe temperature; an exhaust pipe is not overheated, which means that the temperature of the exhaust pipe does not exceed a predetermined safe temperature; the engine rotation speed does not exceed 3500 RPM; and the temperature of the generator does not exceed a predetermined safe temperature value.

According to the present invention, vehicle power unit is combined with power generator device supplying power to the other devices and the features thereof. Switching between two modes (vehicle-moving mode and power generating mode) allows the present invention to perform a feature of instant power supply (externally), providing electrical power to devices other than the vehicle itself, while ensuring that when switching between the two modes, the vehicle is completely stationary, taking the safety concern of the mode-switching operation into the design of the overall controlling process.

DETAILED DESCRIPTION

Figure 1:
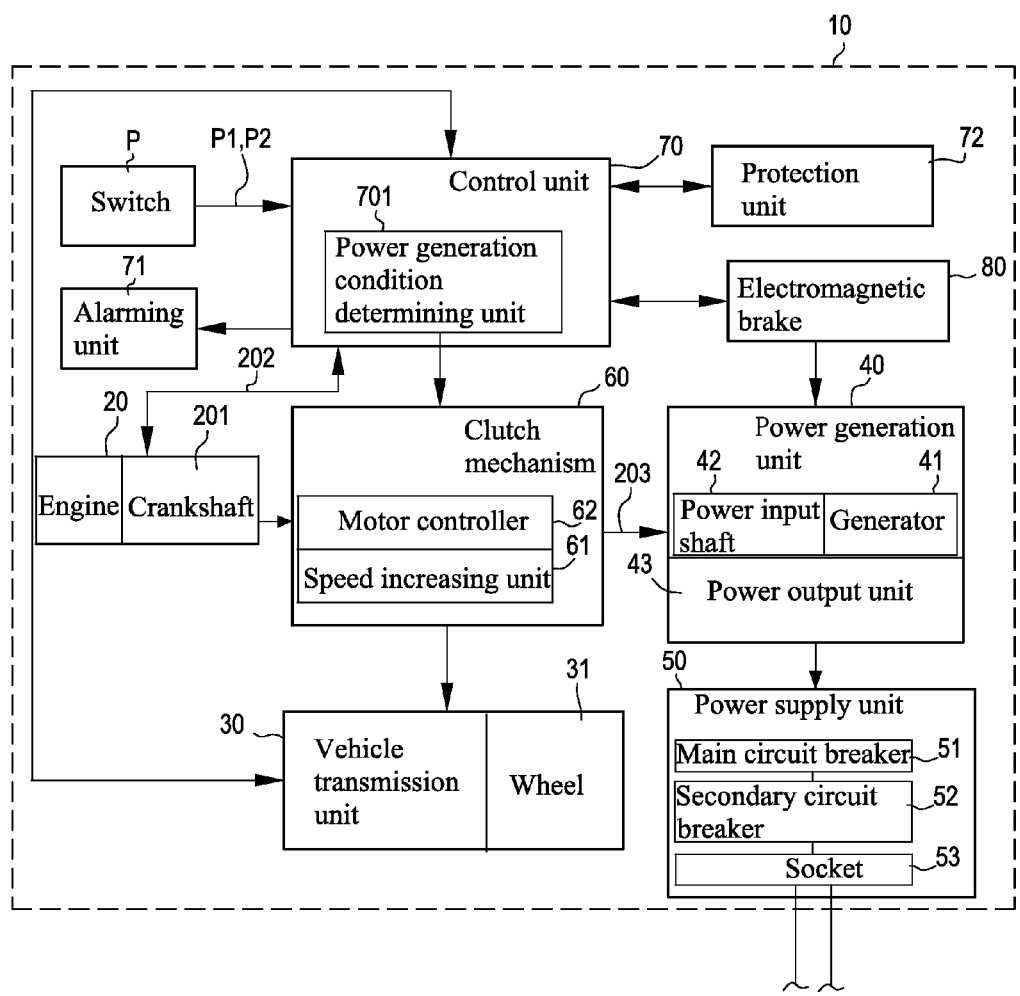
FIG. 1 is a system structure view illustrating the crankshaft is not connected to the power input shaft according to an embodiment of the present invention.

Reference will now be made in detail to the preferred embodiment of the present disclosure, examples of which are illustrated in the accompanying drawings. The accompanying drawings are simplified drawings schematically drawn for the purpose of describing basic structure of the present invention. Hence, only components that are related to the present disclosure will be illustrated in the drawings. Further, the accompanying drawings may not illustrate those components' actual size, shape, or number; these features are selective when implementing the present disclosures and the component layout thereof may be even more complicated.

Generally, vehicles employ microcomputer control (ECU) to collect data from sensors in the vehicle, such as crank angle sensor, engine temperature sensor; throttle opening sensor, engine coolant temperature (ECT) sensor, gear position sensor, and manifold absolute pressure (MAP) sensor.

Please refer to FIG. 1, vehicle 10 comprises vehicle power generation system according to the present embodiment, wherein the vehicle 10 includes an engine 20 that supplies power to the vehicle 10. The engine 20 includes a crankshaft 201, and a vehicle transmission unit 30 connected to the crankshaft 201 and driven by the crankshaft 201, wherein the vehicle transmission unit 30 is further connected to wheels 31 of the vehicle 10 in order to drive the wheels 31. The vehicle power generation system according to the present invention includes a power generation unit 40, a power supply unit 50, a clutch mechanism 60, and a control unit 70. The power generation unit 40 includes a generator, 41, a power input shaft 42 for driving the generator 41 to generate electrical power, and a power output unit 43 electrically connected to the generator 41. A power supply unit 50 connected to the power output unit 43, and is provided with a socket 53 of a power connecting interface to supply power externally (supply power to electrical devices other than those electrically connected to the vehicle battery). A clutch mechanism 60 includes a speed increasing unit 61 connected to the power input shaft 42, and a motor controller 62 used to attach the speed increasing unit to the crankshaft or detaching the speed increasing unit from the crankshaft. A control unit 70 electrically connected to the motor controller 62, and includes a power generation condition determining unit 701 for determining whether the vehicle 10 is under a safe and stationary condition that is suitable for power generation, and then drives the clutch mechanism 60 based on the result.

By employing the previous system, when generating power, a switch P may be used to generate a power generating mode switching signal P1. The control unit 70 receives the power generating mode switching signal P1 to confirm the vehicle 10 is under a condition suitable for power generation according to the power generation condition determining unit 701, and then drives the clutch mechanism 60, making the clutch mechanism 60 to be attached to the crankshaft 201 of the engine 20, thereby allowing the crankshaft 201 to be connected to the power input shaft 42 of the generator 41, and increasing a rotation speed of the engine 20 to a first setting rotation speed value 202, then increasing the rotation speed even more to a second setting rotation speed value 203 through the speed increasing unit 61; thus, the generator 41 is driven and electrical power for the power supply unit 50 is hence generated. Of course, in order to protect the generator 41 or the user, the power supply unit 50 may further include a main circuit breaker 51, a secondary circuit breaker 52 and at least one socket 53, electrically connected sequentially. The current leakage and overload protection value of the secondary circuit breaker 52 should be smaller than the current leakage and overload protection value of the main circuit breaker 51.

When ending power generating mode, the control unit 70 receives a vehicle-moving mode switching signal P2 (which may also be generated by using the switch P), thereby making the clutch mechanism 60 to be detached from the crankshaft 201 and thus stops the generator 41 from generating power. The first setting rotation speed value may be 3000 RPM and the second setting rotation speed value may be 3600 RPM in order to obtain the better power generating efficiency and reduce the heat consumed by the engine 20.

In one embodiment, according to the data sent from sensors to the microcomputer control, the power generation condition determining unit 701 may determine whether the vehicle 10 is under a safe and stationary condition suitable for power generation. The condition includes: (1) a wheel speed of the vehicle is 0; (2) a gearshift of the vehicle is moved to neutral or parking position; (3) a throttle opening of the vehicle is at idle speed position; (4) a handbrake lever of the vehicle is pulled up to a locked position; and (5) the generator is not overheated, which means that the temperature thereof does not exceed a safety value.

Please refer to FIG. 1, wherein the control unit 70 may further include an alarming unit 71. The alarming unit 71 may at least use corresponding audio sound or light signals to indicate whether the vehicle is under a vehicle-moving mode, a power generating mode, or an alarming mode. The vehicle-moving mode is determined by the attachment between the crankshaft 201 and the vehicle transmission unit 30; the power generating mode is determined by the attachment between the crankshaft 201 and the generator 41, plus that the power generation condition determining unit 701 confirms the vehicle 10 is under a condition suitable for power generation; and the alarming mode is determined by the occurrence of one of the below: the wheel speed of the vehicle is not 0; the gearshift of the vehicle is not moved to neutral or parking position; the handbrake lever of the vehicle is not pulled up to a locked position; the throttle opening of the vehicle is not at the idle speed position(the four conditions of the above may be referred as internal signal); and the generator is overheated, the temperature thereof exceeds a safety value (this condition of the above may be referred as external signal). In other words, all of the conditions must meet the standard before it goes to the power generating mode.

Please refer to FIG. 1, in an embodiment of the present invention, the control unit 70 is electrically connected to a protection unit 72. When the engine is overheated, the engine coolant temperature is too high, the exhaust pipe is overheated, or the rotation speed of the engine exceeds 3500 RPM, the protection unit 72 is employed, driving the control unit 70 to cut off the fuel supply system and the engine ignition system (this may be achieved by controlling the ECU, which any person skilled in the art may easily carry out; therefore, related description will be omitted herein for the sake of clarity and simplicity).

Please refer to FIG. 1, in an embodiment of the present invention, the power generation system of the vehicle 10 further includes an electromagnetic brake 80 for braking or releasing the rotation of the generator 41. The electromagnetic brake 80 is electrically coupled to the control unit 70. When the clutch mechanism 60 is driven to be attached to the crankshaft 201 of the engine 20 and the power input shaft 42 of the generator 41, the electromagnetic brake 80 does not operate, and thus releasing the generator 41. On the other hand, when the clutch mechanism 60 is detached from the crankshaft 201 of the engine 20 and the power input shaft 42 of the generator 41, the electromagnetic brake 80 operates, and thus braking the generator 41.

Figure 2:
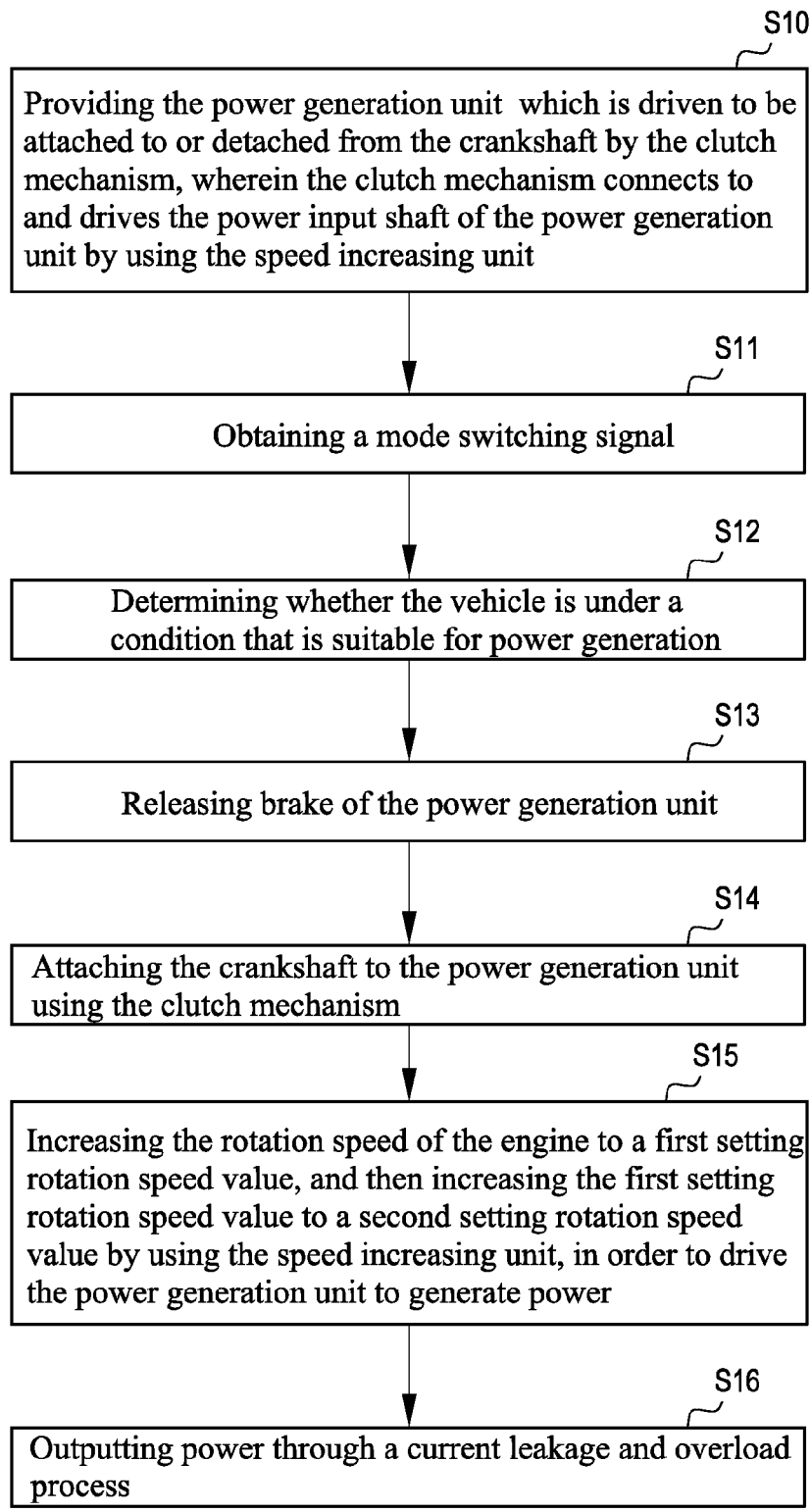
FIG. 2 is a flow chart of vehicle power generating method according to an embodiment of the present invention.

Referring to FIG. 2, in the present embodiment, the vehicle 10 still includes an engine 20 that provides power for the vehicle. The engine 20 includes a crankshaft 201 and a vehicle transmission unit 30 connected to the crankshaft 201 and driven by the crankshaft 201, wherein the vehicle transmission unit 30 is connected to wheels 31 of the vehicle 10. The vehicle power generation method according to the present invention includes steps shown as below.

Step S10: providing the power generation unit 40 which is driven to be attached to or detached from the crankshaft 201 by the clutch mechanism 60, wherein the clutch mechanism 60 connects to and drives the power input shaft 42 of the power generation unit 40 by using the speed increasing unit 61.

Step S11: obtaining a mode switching signal; this step may be performed by using a switch P.

Step S12: determining whether the vehicle 10 is under a condition that is suitable for power generation (the determining of the suitable condition will be described in detail later.)

Step S13: releasing brake of the power generation unit 40.

Step S14: attaching the crankshaft 201 to the power generation unit 40 using the clutch mechanism 60.

Step S15: increasing the rotation speed of the engine 20 to a first setting rotation speed value 202, and then increasing the first setting rotation speed value 202 to a second setting rotation speed value 203 by using the speed increasing unit 61, in order to drive the power generation unit 40 to generate power.

Step S16: outputting power through a current leakage and overload process, wherein the process preferably employs a main-and-secondary circuit breaker mechanism (51, 52) to perform overload protection towards the generator 41 or the user.

In the Step S12 (determining whether the vehicle 10 is under a condition that is suitable for power generation), the determining of the condition includes: the wheel speed of the vehicle is 0; the gearshift of the vehicle is moved to neutral or parking position; the handbrake lever of the vehicle is pulled up to a locked position; the throttle opening of the vehicle is at idle speed position; the engine of the vehicle is not overheated, which means that the temperature thereof does not exceed a predetermined value that is set within the engine safe temperature range; the engine coolant is not overheated, which means that the temperature thereof does not exceed a predetermined value that is set within the engine coolant safe temperature range; the exhaust pipe is not overheated, which means that the temperature thereof does not exceed a predetermined value that is set within the exhaust pipe safe temperature range; the engine rotation speed does not exceed 3500 RPM, which is within the rotation speed safe range; and the temperature of the generator of the vehicle does not exceed a predetermined value that is set within the generator safe temperature range. When all of the above is fulfilled, the vehicle 10 will be determined as under a condition that is suitable for power generation; on the contrary, when any one of the above is not fulfilled, the vehicle 10 will be determined as not under a condition that is suitable for power generation.

Figure 3A:
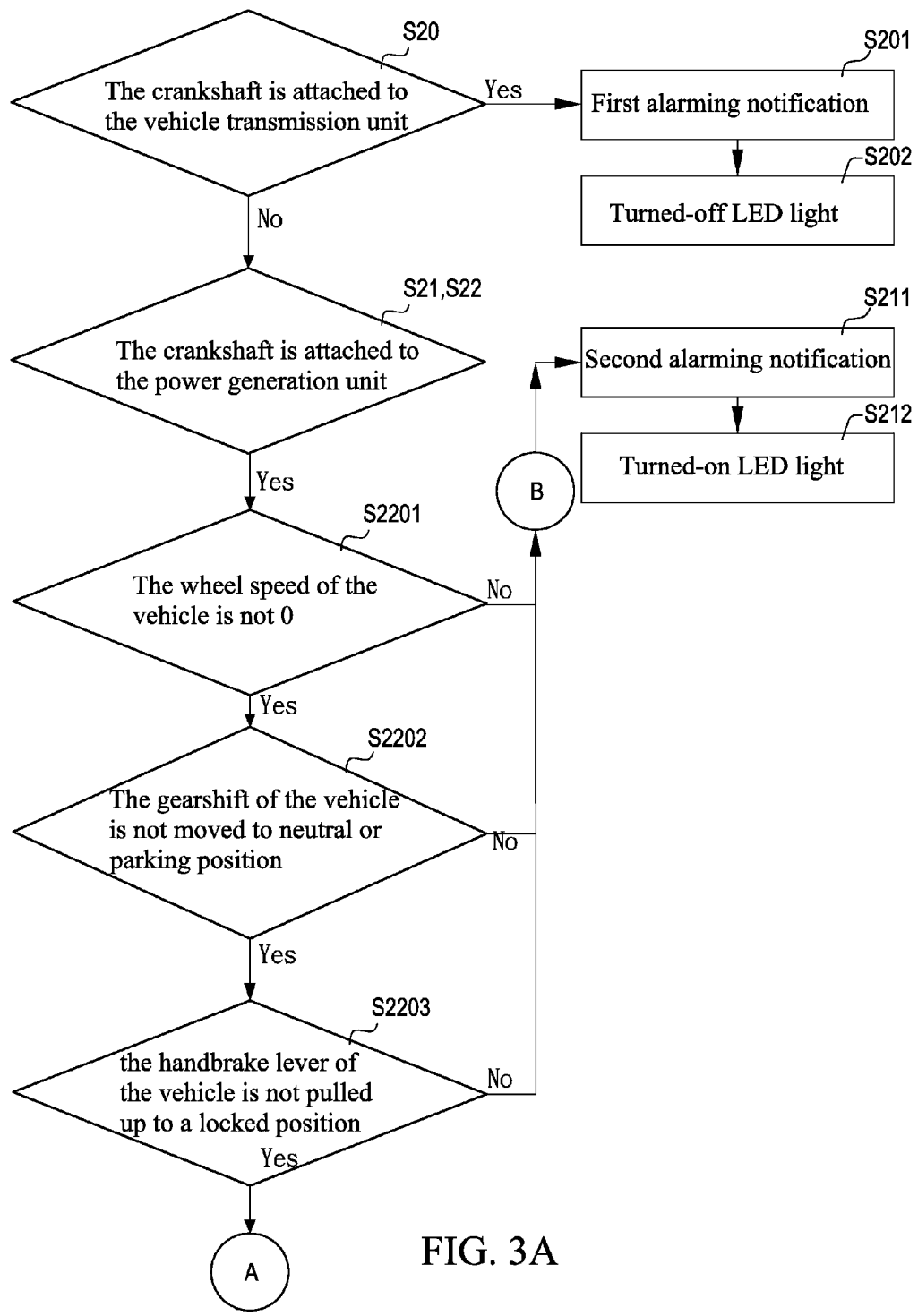
FIGS. 3A and 3B are a flow chart of an alarming method according to an embodiment of the present invention.
Figure 3B:
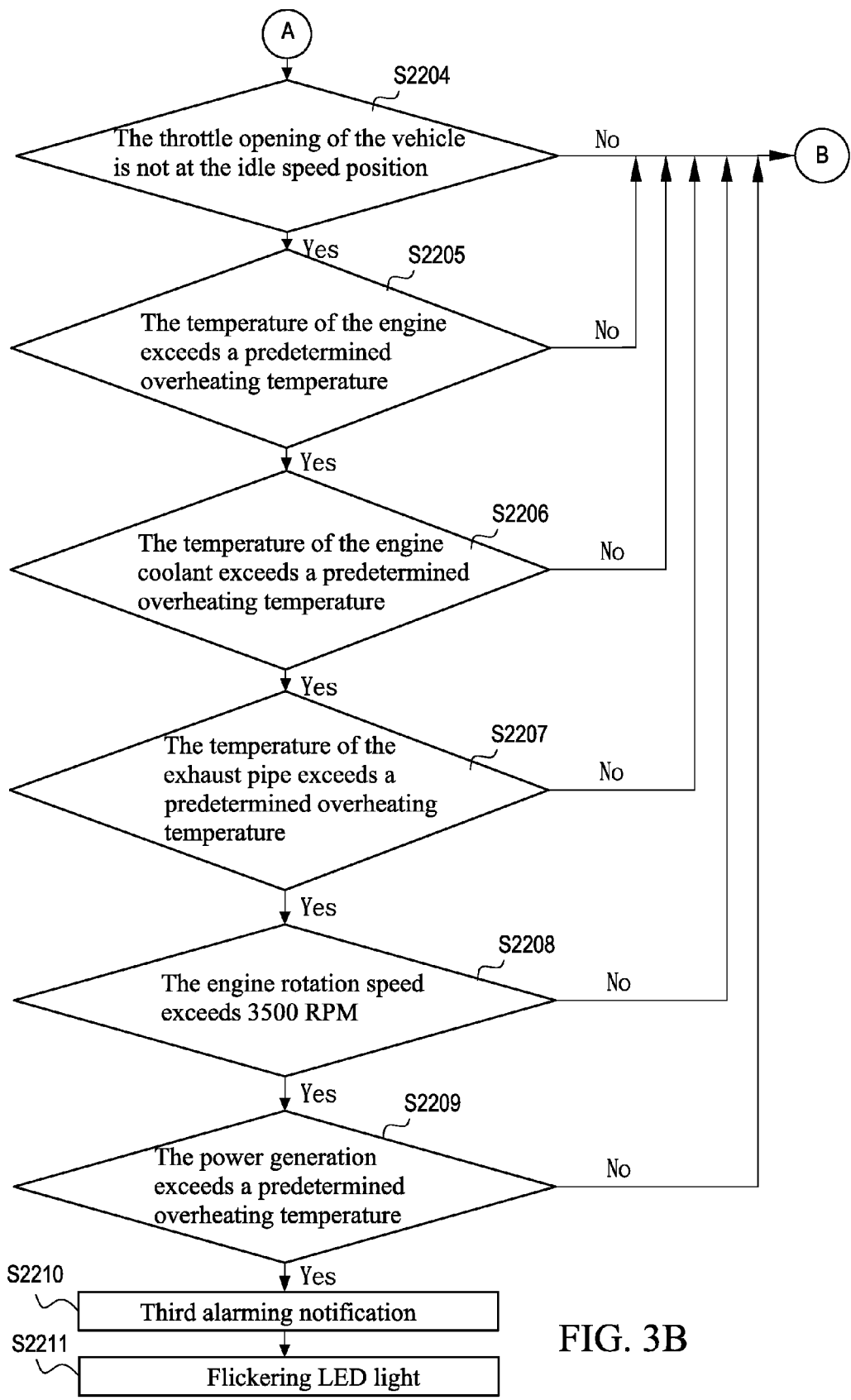

Referring to FIGS. 3A and 3B, in an embodiment of the present invention, an alarming method may be further included therein, the steps are shown as below:

Step S20: performing Step S201 (Step S201: presenting a first alarming notification that corresponds to a vehicle-moving mode) when determining that the crankshaft 201 is attached to the vehicle transmission unit 30, wherein the first alarming notification may be presented using a turned-off LED light (Step S202).

Step S21: performing Step S211 (presenting a second alarming notification that corresponds to a power generating mode) when determining that the crankshaft 201 is attached to the power generation unit 40 and any one of the conditions (listed below) occurs, wherein the second alarming notification may be presented using a turned-on LED light (Step S212).

Step S22: performing Step S2210 (presenting a third alarming notification that corresponds to an alarming mode) when the crankshaft 201 is attached to the power generation unit 40 and the occurrence of all the conditions (listed below) is confirmed: the wheel speed of the vehicle is not 0 (Step S2201); the gearshift of the vehicle is not moved to neutral or parking position (Step S2202); the handbrake lever of the vehicle is not pulled up to a locked position (Step S2203); the throttle opening of the vehicle is not at the idle speed position (Step S2204); the temperature of the engine is overheated, which means the temperature thereof exceeds a predetermined overheating temperature (Step S2205); the engine coolant is overheated, which means that the temperature thereof exceeds a predetermined overheating temperature (Step S2206); the exhaust pipe is overheated, which means that the temperature thereof exceeds a predetermined overheating temperature (Step S2207); the engine rotation speed exceeds 3500 RPM (Step S2208); and the power generation unit is overheated, which means that the temperature thereof exceeds a predetermined overheating temperature (Step S2209); wherein, the third alarming notification may be presented using a flickering LED light (Step S2211).

According to the previous embodiments, a power generator device supplying power to the other devices is combined with the power unit of the vehicle. Switching between two modes (vehicle-moving mode and power generating mode) allows the present invention to perform a feature of instant power supply (externally), providing electrical power to devices other than the vehicle itself, while ensuring that when switching between the two modes, the vehicle is completely stationary, taking the safety concern of the mode-switching operation into the design of the overall controlling process.

The previous description of the preferred embodiment is provided to further describe the present invention, not intended to limit the present invention. Any modification apparent to those skilled in the art according to the disclosure within the scope will be construed as being included in the present invention.

What is claimed is:

1. A vehicle power generation system, wherein the vehicle comprises an engine that supplies power to the vehicle, the engine comprises a crankshaft and a vehicle transmission unit connected to and driven by the crankshaft, and the vehicle transmission unit is connected to wheels of the vehicle;

wherein, the vehicle power generation system comprises:
a power generation unit, including a generator, a power input shaft driving the generator to generate power, and a power output unit electrically connected to the generator;
a power supply unit, connected to the power output unit, and provides a power connecting interface;
a clutch mechanism, including a speed increasing unit connected to the power input shaft, and a motor controller for attaching the speed increasing unit to the crankshaft or detaching the speed increasing unit from the crankshaft; and
a control unit, electrically connected to the motor controller, and includes a power generation condition determining unit for determining whether the vehicle is under a safe and stationary condition that is suitable for power generation, and then driving the clutch mechanism based on the result;
wherein, after the control unit receives a power generating mode switching signal to confirm that the vehicle is under a condition suitable for power generation, the control unit drives the clutch mechanism to attach to the crankshaft of the engine, thereby allowing the crankshaft to be connected to the power input shaft of the generator, and increasing a rotation speed of the engine to a first setting rotation speed value, and then increasing the rotation speed of the engine even more to a second setting rotation speed value through the speed increasing unit, thus the generator is driven and electrical power for the power supply unit is hence generated;
wherein, after the control unit receives a vehicle-moving mode switching signal, the control unit drives the clutch mechanism to detach from the crankshaft, thereby ending power generation;
wherein the power generation condition determining unit determines whether the vehicle is under a safe and stationary condition suitable for power generation according to the conditions included: a wheel speed of the vehicle is 0; a gearshift of the vehicle is moved to neutral or parking position; a throttle opening of the vehicle is at an idle speed position; a handbrake lever of the vehicle is pulled up to a locked position; and a temperature of the generator is not overheated, which means that the temperature of the generator falls into a predetermined safe temperature range; the control unit comprises an alarming unit, the alarming unit may at least use corresponding audio sound or light signals to indicate whether the vehicle is in a vehicle-moving mode, a power generating mode, or an alarming mode, and the control unit receives the mode switching signal sent by a switch, wherein the mode switching signal includes the power generating mode switching signal and the vehicle-moving m switching signal.

2. The vehicle power generation system of claim 1, wherein when the crankshaft is attached to the vehicle transmission unit, the vehicle is in the vehicle-moving mode; when the crankshaft is attached to the generator and the power generation condition determining unit determines that the vehicle is under a condition suitable for power generation, the vehicle is in the power generating mode; and the vehicle is in the alarming mode including: any one of the wheel speed of the vehicle is not 0, the gearshift of the vehicle is not moved to neutral or parking position, the handbrake lever of the vehicle is not pulled up to a locked position; the throttle opening of the vehicle is not at an idle speed position, a temperature of the engine is overheated, a temperature of an engine coolant is overheated, an exhaust pipe is overheated, the rotation speed of the engine exceeds 3500 RPM, or the temperature of the generator exceeds a predetermined safe temperature value.

3. The vehicle power generation system of claim 2, further comprising a protection unit, wherein the protection unit is electrically connected to the control unit, and is employed to drive the control unit to cut off fuel supply system and an engine ignition system of the vehicle when the engine is overheated, the temperature of the engine coolant is too high, the exhaust pipe is overheated, or the rotation speed of the engine exceeds 3500 RPM.

4. The vehicle power generation system of claim 1, wherein the first setting rotation speed value is 3000 RPM, and the second setting rotation speed value is 3600 RPM.

5. The vehicle power generation system of claim 1, further comprising an electromagnetic brake for braking or releasing rotation of the generator, wherein the electromagnetic brake is electrically coupled to the control unit; when the clutch mechanism is driven to attach to the crankshaft of the engine and the power input shaft of the generator, the electromagnetic brake does not operate, in order to release the generator; and when the clutch mechanism is detached from the crankshaft of the engine and the power input shaft of the generator, the electromagnetic brake operates, in order to brake the generator.

6. The vehicle power generation system of claim 1, wherein the power supply unit further includes a main circuit breaker, a secondary circuit breaker and at least one socket, electrically connected sequentially; a current leakage and overload protection value of the secondary circuit breaker is smaller than a current leakage and overload protection value of the main circuit breaker.

7. A vehicle power generation method, wherein the vehicle comprises an engine that supplies power to the vehicle, the engine comprises a crankshaft and a vehicle transmission unit connected to and driven by the crankshaft, and the vehicle transmission unit is connected to wheels of the vehicle;

wherein, the vehicle power generation method comprises steps of:
providing a power generation unit, which is driven to be attached to or detached from the crankshaft by a clutch mechanism, wherein the clutch mechanism is connected to and drives a power input shaft of the power generation unit by using a speed increasing unit;
obtaining a mode switching signal;
determining whether the vehicle is under a condition that is suitable for power generation;
releasing brake on the power generation unit;
using the clutch mechanism to attach the crankshaft to the power generation unit;
increasing a rotation speed of the engine to a first setting rotation speed value, and increasing the first setting rotation speed value to a second setting rotation speed value by using the speed increasing unit, thereby driving the power generation unit to generate power; and outputting the generated power through a current leakage and overload process;

wherein the step of determining whether the vehicle is under a safe and stationary condition suitable for the power generation is performed based on conditions included: a wheel speed of the vehicle is 0; a gearshift of the vehicle is moved to neutral or parking position; a handbrake lever of the vehicle is pulled up to a locked position; a throttle opening of the vehicle is at an idle speed position; a temperature of the engine is not overheated, which means that the temperature of the engine does not exceed a predetermined safe temperature; a temperature of an engine coolant is not overheated, which means that the temperature of the engine coolant does not exceed a predetermined safe temperature; an exhaust pipe is not overheated, which means that the temperature of the exhaust pipe does not exceed a predetermined safe temperature; the rotation speed of the engine does not exceed 3500 RPM; and the temperature of the generator does not exceed a predetermined safe temperature value.

8. The vehicle power generation method of claim 7, further comprising an alarming method comprising steps of:

presenting a first alarming notification that corresponds to a vehicle-moving mode when determining that the crankshaft is attached to the vehicle transmission unit;

presenting a second alarming notification that corresponds to a power generating mode when determining that the crankshaft is attached to the power generation unit; and presenting a third alarming notification that corresponds to an alarming mode when the crankshaft is attached to the power generation unit and the occurrence of all the conditions is confirmed: a wheel speed of the vehicle is not 0; a gearshift of the vehicle is not moved to neutral or parking position; a handbrake lever of the vehicle is not pulled up to a locked position; a throttle opening of the vehicle is not at the idle speed position; the engine is overheated, which means the temperature of the engine exceeds a predetermined overheating temperature; a temperature of an engine coolant is overheated, which means that the temperature of the engine coolant exceeds a predetermined overheating temperature; an exhaust pipe is overheated, which means that the temperature of the exhaust pipe exceeds a predetermined overheating temperature; the rotation speed of the engine exceeds 3500 RPM; and the power generation unit is overheated, which means that the temperature of the power generation exceeds a predetermined overheating temperature;

wherein, the first alarming notification is presented using a turned-off LED light, the second alarming notification is presented using a turned-on LED light, and the third alarming notification is presented using a flickering LED light.

* * * * *